United States Patent
Le Gargean et al.

(10) Patent No.: US 11,328,069 B2
(45) Date of Patent: May 10, 2022

(54) METHOD AND SYSTEM FOR VERIFYING A DATA ERASURE PROCESS

(71) Applicant: Blancco Technology Group IP Oy, Joensuu (FI)

(72) Inventors: Bernard Le Gargean, Joensuu (FI); Victor Gonzalo, Joensuu (FI)

(73) Assignee: BLANCCO TECHNOLOGY GROUP IP OY, Joensuu (FI)

( * ) Notice: Subject to any disclaimer, the term of this patent is extended or adjusted under 35 U.S.C. 154(b) by 220 days.

(21) Appl. No.: 16/481,416

(22) PCT Filed: Feb. 2, 2018

(86) PCT No.: PCT/EP2018/052703
§ 371 (c)(1),
(2) Date: Jul. 26, 2019

(87) PCT Pub. No.: WO2018/141929
PCT Pub. Date: Aug. 9, 2018

(65) Prior Publication Data
US 2019/0392153 A1    Dec. 26, 2019

(30) Foreign Application Priority Data
Feb. 2, 2017   (GB) ..................... 1701747

(51) Int. Cl.
*G06F 21/60*    (2013.01)
*G06F 3/06*    (2006.01)
(Continued)

(52) U.S. Cl.
CPC ............ *G06F 21/60* (2013.01); *G06F 3/0623* (2013.01); *G06F 3/0652* (2013.01);
(Continued)

(58) Field of Classification Search
CPC ...... G06F 21/60; G06F 3/0623; G06F 3/0652; G06F 3/0673; G06F 12/0223;
(Continued)

(56) References Cited

U.S. PATENT DOCUMENTS

| | | | | | |
|---|---|---|---|---|---|
| 4,612,640 | A | * | 9/1986 | Mehrotra | ............ G06F 11/1076 714/766 |
| 5,742,614 | A | * | 4/1998 | Cline | .................. G06F 11/2226 714/719 |

(Continued)

FOREIGN PATENT DOCUMENTS

| | | |
|---|---|---|
| JP | 2007250187 | 9/2007 |
| JP | 2015528159 | 9/2015 |

(Continued)

OTHER PUBLICATIONS

Gabriele Bonetti et al: "A comprehensive black-box methodology fortesting the forensic characteristics of solid-state drives", Dec. 9, 2013; Dec. 9, 2013-Dec. 13, 2013, Dec. 9, 2013 (Dec. 9, 2013), pp. 269-278, XP058035993, ISBN: 978-1-4503-2015-3 DOI: 10.1145/2523649.2523660.

(Continued)

*Primary Examiner* — Mohammad W Reza
(74) *Attorney, Agent, or Firm* — Dickinson Wright PLLC (57) ABSTRACT

A method of erasing data from a data storage apparatus comprising a memory, the method comprises writing a known data pattern to a plurality of known memory locations of the data storage apparatus, causing the data storage apparatus to perform a data erasure procedure, reading data stored at the known memory locations after completion of the data erasure procedure, comparing the read data and the data of the known data pattern, and determining a verifica- (Continued)

Before

| 731B | 73CB | 117C | C169 | 74EB |
|---|---|---|---|---|
| 6914 | 7171 | B174 | 5C17 | 0710 |
| 33B0 | 0000 | 11B7 | BC71 | C41B |
| 117C | 07BE | 997C | 7E1C | 565C |
| 3677 | 717C | 0710 | 6377 | 0101 |
| 773C | E310 | CC1C | C707 | 171C |
| 3333 | 6367 | 7194 | 1111 | 7731 |
| CC1C | 137B | E143 | 74C7 | 5615 |

After

| 69A4 | 7171 | B1D4 | 5C17 | 0F10 |
|---|---|---|---|---|
| 1A7C | 07BE | 99DC | 7F1C | 565C |
| 773C | A310 | CD1C | C707 | 17FC |
| 3FC3 | 63A7 | 7194 | F1F1 | 7731 |
| 13B0 | 0D0A | 11B7 | BC7F | C41B |
| FC1C | 13AB | E143 | 74A7 | 561F |
| 731B | A3CB | 117C | C169 | 74EB |
| 3677 | 717C | 071D | 6D77 | 0101 | tion result based at least in part on the result of the comparison between the read data and the data of the known data pattern.

23 Claims, 6 Drawing Sheets

(51) Int. Cl.
  *G06F 12/02* (2006.01)
  *G06F 12/14* (2006.01)
  *G06F 21/79* (2013.01)
  *H04L 9/08* (2006.01)
(52) U.S. Cl.
  CPC ........ *G06F 3/0673* (2013.01); *G06F 12/0223* (2013.01); *G06F 12/1408* (2013.01); *G06F 21/79* (2013.01); *H04L 9/0891* (2013.01); *G06F 2212/1052* (2013.01); *G06F 2221/2143* (2013.01)
(58) Field of Classification Search
  CPC .................. G06F 12/1408; G06F 21/79; G06F 2212/1052; G06F 2221/2143; G06F 2221/033; G06F 21/62; H04L 9/0891; G11B 5/024; G11B 20/00666
  See application file for complete search history.

(56) References Cited

U.S. PATENT DOCUMENTS

| | | | | |
|---|---|---|---|---|
| 5,875,195 | A * | 2/1999 | Dixon ................... | G06F 11/261 714/719 |
| 9,317,217 | B1 | 4/2016 | Adogla | |
| 2014/0325179 | A1 * | 10/2014 | Yang ................... | G06F 11/1068 711/206 |
| 2015/0309925 | A1 | 10/2015 | Casperson et al. | |

FOREIGN PATENT DOCUMENTS

| | | |
|---|---|---|
| JP | 6055047 | 12/2016 |
| KR | 1020150032871 | 3/2015 |

OTHER PUBLICATIONS

Anonymous: "Gutmann method—Wikipedia", Dec. 31, 2016 (Dec. 31, 2016), XP055467041, Retrieved from the Internet <URL:https://en.wikipedia.org/w/index.php?title=Gutmann_method&oldid=757543627> [retrieved on Apr. 13, 2018].
Graeme B Bell et al: "Solid State Drives: The Beginning of the End for Current Practice in Digital Forensic Recovery?", The Journal of Digital Forensics, Security and Law: JDFSL, Jul. 1, 2010 (Jul. 1, 2010), Farmville, pp. 5, XP055466667, Retrieved from the Internet <URL:http://ojs.jdfsl.org/index.php/jdfsl/article/viewFile/21/45> [retrieved on Apr. 12, 2018].
International Search Report and Wiitten Opinion dated Aug. 9, 2018 in PCT/EP2018/052703.
Kiseel, Richard et al., "Guidelines for Media Sanitization," XP055537214 retrieved from internet: https://nvlpubs.nist.gov/nistpubs/specialpublications/nist.sp.800-88r1.pdf [retrieved on Dec. 20, 2018].
International Preliminary Report on Patentability dated May 6, 2019 in PCT/EP2018052703.
Japanese Office Action dated Oct. 5, 2021 issued on related Japanese patent application 2019-541692 by the Japanese Patent Office.
Notice of Preliminary Rejection (Grounds for Rejection) dated Jan. 14, 2022 (Jan. 14, 2022) on related Korean patent application 10-2019-7025435 by the Korean Intellectual Property Office.

* cited by examiner

Before

| 731B | 73CB | 117C | C169 | 74EB |
|------|------|------|------|------|
| 6914 | 7171 | B174 | 5C17 | 0710 |
| 33B0 | 0000 | 11B7 | BC71 | C41B |
| 117C | 07BE | 997C | 7E1C | 565C |
| 3677 | 717C | 0710 | 6377 | 0101 |
| 773C | E310 | CC1C | C707 | 171C |
| 3333 | 6367 | 7194 | 1111 | 7731 |
| CC1C | 137B | E143 | 74C7 | 5615 |

Figure 1A

After

| 69A4 | 7171 | B1D4 | 5C17 | 0F10 |
|------|------|------|------|------|
| 1A7C | 07BE | 99DC | 7F1C | 565C |
| 773C | A310 | CD1C | C707 | 17FC |
| 3FC3 | 63A7 | 7194 | F1F1 | 7731 |
| 13B0 | 0D0A | 11B7 | BC7F | C41B |
| FC1C | 13AB | E143 | 74A7 | 561F |
| 731B | A3CB | 117C | C169 | 74EB |
| 3677 | 717C | 071D | 6D77 | 0101 |

Figure 1B

| Before | | | | | | | |
|---|---|---|---|---|---|---|---|
| 731B | 73CB | 117C | C169 | 74EB | | | |
| 6914 | 7171 | B174 | 5C17 | 0710 | | | |
| 33B0 | 0000 | 11B7 | BC71 | C41B | | | |
| 117C | 07BE | 997C | 7E1C | 565C | | | |
| 3677 | 717C | 0710 | 6377 | 0101 | | | |
| 773C | E310 | CC1C | C707 | 171C | | | |
| 3333 | 6367 | 7194 | 1111 | 7731 | | | |
| CC1C | 137B | E143 | 74C7 | 5615 | | | |

Figure 2A

| After | | | | | |
|---|---|---|---|---|---|
| 0000 | 0000 | 0000 | 0000 | 0000 | |
| 0000 | 0000 | 0000 | 0000 | 0000 | |
| 0000 | 0000 | 0000 | 0000 | 0000 | |
| 0000 | 0000 | 0000 | 0000 | 0000 | |
| 0000 | 0000 | 0000 | 0000 | 0000 | |
| 0000 | 0000 | 0000 | 0000 | 0000 | |
| 0000 | 0000 | 0000 | 0000 | 0000 | |
| 0000 | 0000 | 0000 | 0000 | 0000 | |

METHOD AND SYSTEM FOR VERIFYING A DATA ERASURE PROCESS

CROSS-REFERENCE TO RELATED APPLICATIONS

This application is U.S. national phase filing under 35 U.S.C. § 371 of PCT/EP2018/052703 (the "703 application") filed on Feb. 2, 2018 and titled, "Method and System for Verifying a Data Erasure Process." The '703 application claims priority from the Great Britain Application No. 1701747.6 filed Feb. 2, 2017 and titled, "Method and System for Verifying a Data Erasure Process." Both of the aforementioned applications are incorporated herein by reference in their entireties for all purposes.

FIELD

This application relates to a method and apparatus for use in the erasure of data from a data storage apparatus, for example an encrypting drive, optionally a self-encrypting drive.

BACKGROUND

It may be desirable to remove data such as sensitive data from a data storage apparatus when the data storage apparatus is to be repurposed, reallocated to a new user, or retired. The continued drive towards enhanced privacy and data protection legislation and the introduction of associated environmental regulations serves to emphasise the importance of the effective erasure of data from data storage apparatuses.

International data erasure standards exist which define actions which are required to securely erase data from different types of data storage apparatus. The data erasure standards specify different verification criteria which need to be met to provide assurance that data has been effectively erased from different types of data storage apparatus.

Figure 1A:
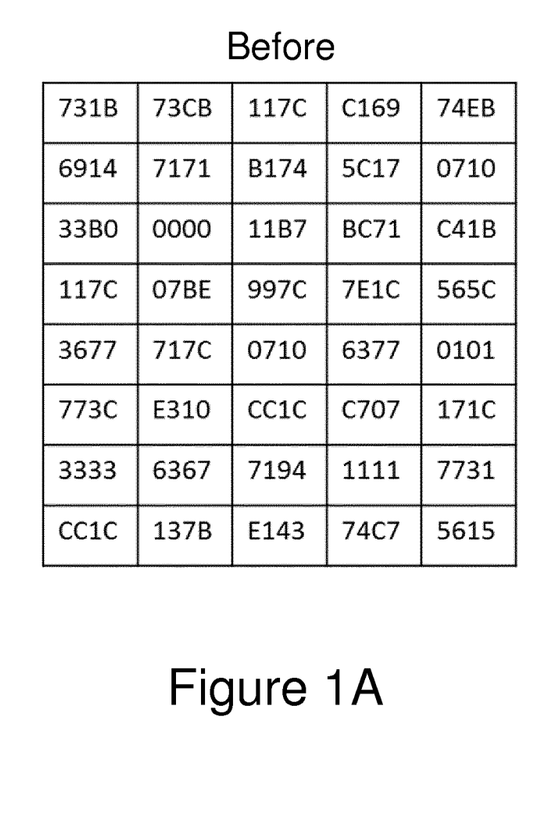
FIG. 1A illustrates, at a logical level, data read from a plurality of memory addresses of a data storage apparatus before the data storage apparatus performs a cryptographic data erasure procedure.
Figure 1B:
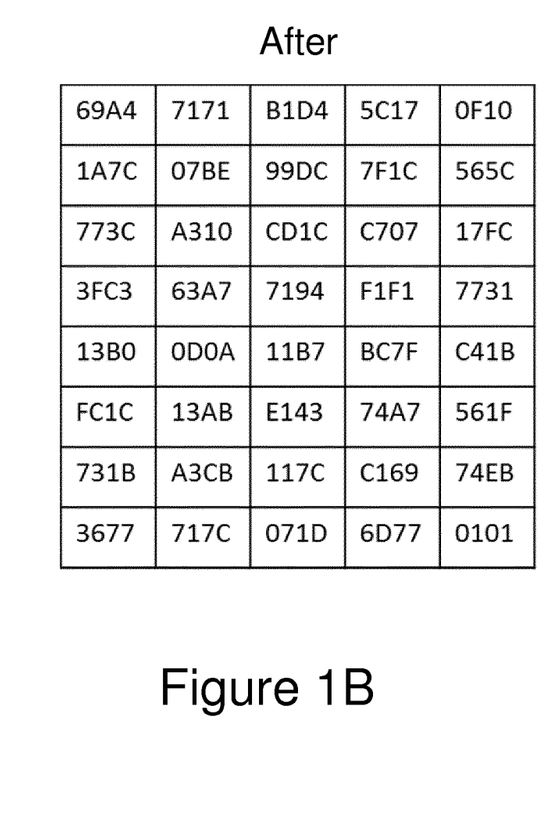
FIG. 1B illustrates, at a logical level, data read from the plurality of memory addresses of FIG. 1A after the data storage apparatus performs the cryptographic data erasure procedure to replace the key used for encryption/decryption.

Known techniques used for removing data from a data storage apparatus may include using a data eraser apparatus external to the data storage apparatus to write a predetermined data pattern to fill the entire data storage apparatus and replace sensitive data with redundant or null data. The predetermined data pattern is usually determined by the data eraser apparatus according to the requirements of the erasure standard being followed. Alternatively, the data storage apparatus may include firmware which defines an internal erasure procedure performed by the data storage apparatus for over-writing sensitive data stored in the data storage apparatus. The internal erasure procedure may be initiated by a data eraser apparatus external to the data storage apparatus. The particular internal erasure procedure used may vary according to the type of data storage apparatus and/or the type of interface used between data storage apparatus and a data eraser apparatus. For example, a cryptographic erasure procedure is known for use with Self-encrypting Drives (SEDs) in which the key used to decrypt the stored data is changed, thus rendering the stored data meaningless. This may result in the data that is obtained by reading from the SED being different before and after cryptographic erasure due to the data being decrypted using the new key. As the data in question was originally encrypted using a different key, decryption using the new key will result in meaningless or apparently random data being output, even though the data stored on the physical device has not changed. This is illustrated in FIGS. 1A and 1B which present a logical view of data decrypted and output from the SED before and after cryptographic erasure (e.g. replacement of the key). It can be seen that the data that is read out before and after cryptographic erasure is different even though the data stored on the physical device and subject to the read procedure has not changed.

Figure 2A:
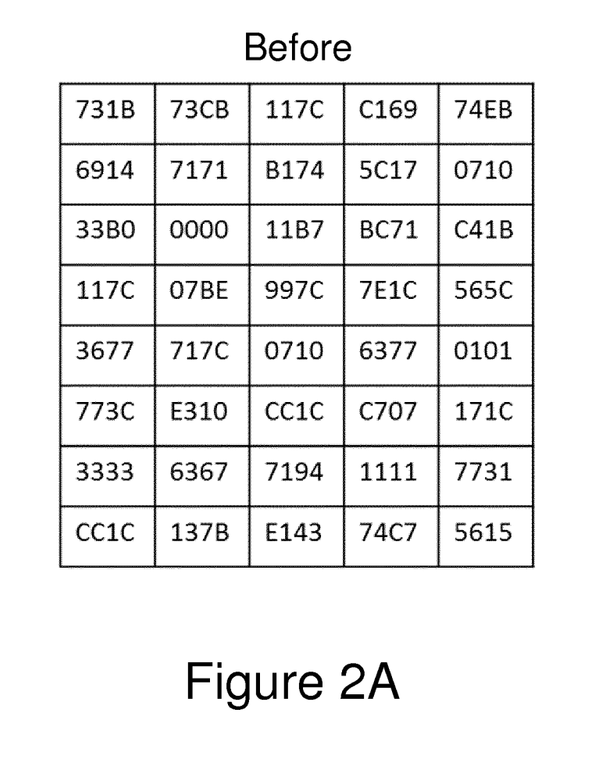
FIG. 2A illustrates data stored within a plurality of memory addresses of a data storage apparatus before the data storage apparatus performs a data erasure procedure.
Figure 2B:
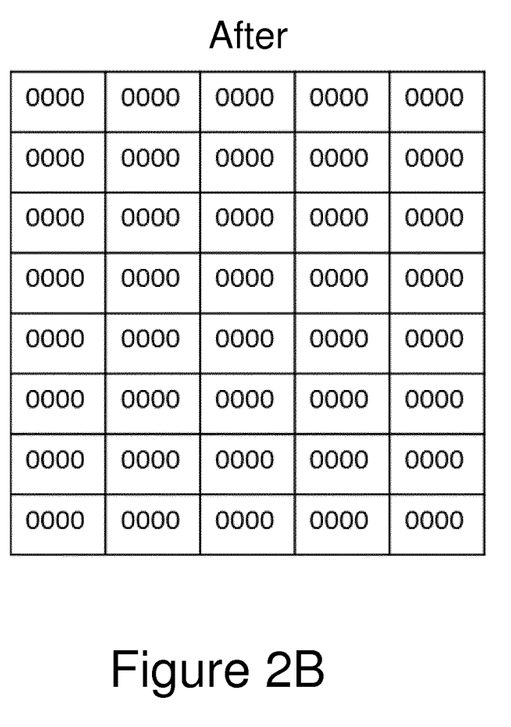
FIG. 2B illustrates data stored at the plurality of memory addresses of FIG. 2A after the data storage apparatus performs a data erasure procedure.

An over-write erasure procedure is known for use with Hard Disk Drives (HDDs) in which stored data is replaced with a pre-determined data pattern. For example, it is known to over-write the memory of a HDD with all binary zeroes as shown in FIGS. 2A and 2B. A block erase procedure is also known for use with Solid State Drives (SSDs) in which a block erasure is performed (tunnel release) on NAND flash memory.

However, it can be difficult to meet the verification requirements dictated by an erasure standard when using such internal erasure procedures, because the exact details of the particular internal erasure procedure used by a particular data storage apparatus may not be known or may not be provided. For example, if the result of an internal erasure procedure is that the memory of the data storage apparatus has been over-written with random data (or "random-looking" data) or random looking data is produced due to use of a cryptographic erasure technique it can be very difficult to verify whether the data stored in the data storage apparatus after completion of the internal erasure procedure was successfully written as part of the internal erasure procedure, whether the stored data after completion of the internal erasure procedure has been changed as a result of use of a cryptographic erasure procedure, or whether the stored data is the same data that was previously stored in the data storage apparatus before the internal erasure procedure was performed as a consequence of a failure of the data erasure procedure. As a result, a data storage apparatus may be deemed to have failed a data erasure procedure when, in fact, the data erasure procedure may have been successful. In turn, this may result in the data erasure procedure being repeated on the failed data storage apparatus or may even result in the failed data storage apparatus being destroyed unnecessarily.

Reading data stored on a data storage apparatus before execution of an internal erasure procedure requires the read data to be stored temporarily or cached if it is to be used for comparison purposes with data read from the apparatus after execution of the erasure procedure. As a consequence of the data storage capacity of some types of data storage apparatus, it may simply not be practical to store or cache a sufficient proportion of the total data storage capacity of some types of data storage apparatus to meet a given erasure standard. For example storing or caching 10% of a 500 GB drive would require 50 GB of temporary storage capacity, which may be difficult or impossible to obtain in practice, for example using RAM, Moreover, temporarily storing the data remotely from the data storage apparatus and the data eraser apparatus may represent a security risk. For example, cached data may be a potential security risk if its storage location becomes known to a third party, or is otherwise compromised.

To provide further details concerning known data erasure standards, there exist international standards (erasure standards) that define the required actions to securely erase data from all types of medium. The standards, which can vary depending on which entity issues them, outline the specific methods required to sanitize storage technology, as well as hard copies and other assets that may store data e.g. fax machines or network routers. Within these requirements there is an explicit control that focuses on the verification part of the process. This is to provide assurance that the data has been removed/destroyed and incorporates manual or automated methods.

When regarding storage that is connected to a host computer/laptop/server machine, there exist various different interfaces (ATA, Serial AT Attachment (SATA), Parallel ATA (PATA), AT Attachment (ATA), AT Attachment Packet Interface (ATAPI), Small Computer System Interface (SCSI), Serial Attached SCSI (SAS), Universal Serial Bus (USB), Peripheral Component Interconnect Express (PCI Express or PCIe), Non-Volatile Memory Express (NVM Express or NVMe etc) and standards to standardize the ways they connect to and communicate with a host machine (for example Serial AT Attachment (SATA), Parallel ATA (PATA) or the AT Attachment (ATA) or AT Attachment Packet Interface (ATAPI) standards).

The published standards associated with these interfaces may govern the ways of performing all disk functionality. These interface standards are generally managed by key stakeholders, such as drive manufacturers, and are made available so software can use and interact with storage to enable the storing or retrieving of data, whilst ensuring its integrity.

The primary technique used to remove digital data from storage assets consists of writing a predetermined data pattern to fill the entire storage device, thus replacing the sensitive information with redundant or null data. In cases where the storage asset can be attached to a computer (e.g. a Hard Disk Drive), these techniques are often performed by a host application that determines a pattern (usually based on the requirements of the erasure standard being followed) and applies it across the entire addressable area of the device. Alternatively, there are sanitization commands that can be executed by the firmware of a storage device to perform data deletion. These commands can vary slightly across the different interfaces and are initiated by the host application but performed by the device itself. In some cases the commands will overwrite data, but there are some variations:

Cryptographic erase (for Self-Encrypting Drives—SEDs—only)
The key used to encrypt data is changed, thus rendering the stored data as nonsensical.
Overwrite (designed for HDDs)
A firmware-based overwrite command that replaces user data with a host-specified pattern.
Block Erase (designed for SSDs)
This may be used to erase user data areas of a device using, for example, techniques such as tunnel release or any other suitable technique.

When firmware erasure commands, for example such as those outlined above, are used as the primary way of erasing data, the efficacy of data erasure may be dependent on these firmware erasure commands performing according to the standards, and this is where verification plays a key role as it allows the success of erasure to be confirmed (or otherwise) by reading back data to ensure that no user data exists.

The firmware erasure processes above are generally standardized by their respective documentation. Within these documents is a description of how the storage device should be behave when requested to perform a specific task. In the case of erasure commands, the specification documents will declare details, such as the data pattern a drive should write when overwriting or properties and flags to be set.

Issues begin to arise when trying to meet the mandated verification requirements (provided by the erasure standard). For example, an interface standard (for example ATA, ATAPI or any other suitable standard) may be provided but this may only offer vague information about what a firmware command should do, or manufacturers may implement unstandardized/erroneous means of doing the task, both of which cause a result that is difficult to verify.

If the result of a firmware command is that the drive has overwritten the device with random data (or produced random looking data due to cryptographic erasure), it can be difficult for the erasure software (during the verification process) to know if this data has actually been written by the drive's firmware software, changed as the result of a crypto erase or if it is the same data that was there previously and an error has occurred in the erasure action. The erasure tool would have to know what was on the device prior to the erasure taking place to be able to ensure that it has completed successfully (comparing the before and after states). It may be possible to take a snapshot of the drive prior to erasure but the scale and size of devices mean that this is not a practical task, and raises issues of where such a snapshot would be stored. RAM may not have sufficient capacity to store the data and perform tasks while meeting the minimum requirements for how much of a device to verify. Storing the data somewhere else may represent a security risk.

The result of this is that drives are failing the erasure process when they don't necessarily need to. This is because, for example, the erasure software will expect a drive full of a consistent pattern but may encounter 'random' data and deem the process a fail. This random data may be have written by a device or the result of crypto erase so the erasure has in fact been a success and suitable for the needs of the user. The upshot of this may be that exceptions are raised, time may be wasted reprocessing a (wrongly) failed device and hardware may be destroyed unnecessarily Indeed, this issue is compounded in industries where data erasure is performed on a large scale (IT Asset Disposition industry). In this situation any time wasted can impact greatly on any return on investment from a device and operators may be prone to destroy apparently misbehaving assets rather than attempt to erase them again or understand why they are failing. More advanced processes are needed to understand if the drive is performing erasure properly or not and report these to a user. For example, a medium-sized processing facility may erase of the order of 80,000 drives a year with successful erasure of one device potentially taking up to several hours. Thus, any reduction in the rate of devices failing to meet a data erasure specification, may provide significant savings in time and money.

SUMMARY

It should be understood that any one or more of the features of any of the following aspects or embodiments may be combined with any one or more of the features of any of the other aspects or embodiments. For example, method features may be applied as apparatus features and vice versa.

According to a first aspect there is provided a method of erasing data from a data storage apparatus comprising a memory, the method comprising:
writing a known data pattern across a plurality of known memory locations of the data storage apparatus;
causing the data storage apparatus to perform a data erasure procedure;
reading data stored at the known memory locations after completion of the data erasure procedure;
comparing the read data and the data of the known data pattern; and determining a verification result based at least in part on the result of the comparison between the read data and the data of the known data pattern.

The data erasure procedure may be performed internally within the data storage apparatus. The data erasure procedure may be predefined. For example, the data storage apparatus may comprise at least one of hardware, firmware, and software, and the data erasure procedure may be defined by at least one of the hardware, firmware, and software of the data storage apparatus.

The data storage apparatus may comprise an encrypting data storage apparatus.

The plurality of known memory locations may be physical or logical memory addresses. The known locations may comprise selected and/or pre-determined locations. Said data pattern may be different for the different locations, or different parts of the same data pattern may be used for the different locations. Said data pattern may be the same at the different locations.

The method may comprise writing a known data pattern directly across the plurality of known memory locations of the data storage apparatus.

The writing and/or reading may be performed without using and/or independently of a file system and/or file transfer protocol associated with the memory.

The method may be such as to not rely on any kind of file transfer protocol and/or not to use a file system associated with the device. This means that all available addressable memory space may potentially be erased and that the memory addresses which may potentially be erased are not limited by any file system configuration of the data storage apparatus, including the logical partition which that a file system may reside on.

The plurality of known memory locations of the data storage apparatus may be defined using logical block addressing (LBA). The plurality of locations may be logical block addresses. LBA may consider any and all memory blocks of the data storage apparatus as viable targets for writing or reading data including locations corresponding to a root file system within any file system which may be present or which may reside on the data storage apparatus. The method may treat the addressable area of the storage as a single entity with no way to tell where any file or stored information stops and begins. Metadata about files may be not recognised and the known data pattern may be simply overwritten "in-place". The method may apply specific LBA ranges, instead of this being managed by a file system. Use of LBA may avoid fragmentation of any kind because the known data pattern is written directly to the memory of the data storage apparatus. Use of LBA may avoid any obfuscation of the location of data. By using LBA disk access may be performed directly (and thus, for example, with greater control) without going through a file system.

The data erasure procedure may comprise erasing data from substantially all of the addressable memory.

The data erasure procedure may comprise writing a further data pattern to the memory.

The further data pattern may comprise at least one of: a predefined static pattern, all 1s, all 0s, a random data pattern, a series of ones and zeroes or any other suitable pattern repeated at least once, for example a 0x55, 0xAA or 0x3C series repeated at least once, a series of ones and zeroes or any other suitable pattern repeated periodically, for example a 0x55, 0xAA or 0x3C series repeated periodically.

The data erasure procedure may comprise replacing or deleting a key used to encrypt and/or decrypt data.

Comparing the read data and the data of the known data pattern may comprise regenerating or reproducing the known data pattern and comparing the read data with the data of the known data pattern after regeneration or reproduction thereof.

Such a method may allow verification of the data erasure procedure performed by the data storage apparatus regardless of the exact details of the data erasure procedure. Such a method may also avoid any requirement to temporarily store or cache sensitive data stored in the data storage apparatus prior to the data storage apparatus performing the data erasure procedure.

The method may comprise providing a positive verification result according to whether a predetermined proportion or amount of the read data and the data of the known data pattern are different. The predetermined proportion or amount of the read data and the data of the known data pattern may be defined by one or more data erasure standards and/or may be user-definable. The method may comprise providing a positive verification result according to whether all of the read data and the data of the known data pattern are different. The predetermined proportion or amount may be a proportion or amount selected prior to performance of the method, for example immediately prior to the performance of the method, or may be pre-stored.

The method may comprise providing a negative verification result according to whether a predetermined proportion or amount of the read data and the data of the known data pattern are substantially the same. The predetermined proportion or amount of the read data and the data of the known data pattern may be defined by one or more data erasure standards and/or may be user-definable. The method may comprise providing a negative verification result according to whether one or more bytes of the read data and the data of the known data pattern, for example a predetermined or selected number or proportion of bytes, are substantially the same. The condition for failure, e.g. a negative verification, may be that the read data and the data of the known data pattern match, to any predefined tolerance level. The tolerance level may, at one extreme, require only that a single byte matches between the read data and the data of the known data pattern in order to provide a negative result. Alternatively, the method may comprise providing a negative verification result according to whether all of the read data and the data of the known data pattern are substantially the same as each other (for example comparing data at corresponding logical or physical locations), or according to any selected tolerance.

The method may comprise, in response to the providing of a negative verification result:

causing the data storage apparatus to perform the data erasure procedure one or more additional times; and/or indicating that the data storage apparatus should be destroyed; and/or performing an alternative erasure procedure.

The method may comprise writing the known data pattern across a selected or predetermined proportion or amount of a total data storage capacity of the data storage apparatus. For example, the method may comprise writing the known data pattern across at least 1%, 2%, 5% or 10% of the total data storage capacity of the data storage apparatus. The selected or predetermined proportion or amount of the total data storage capacity of the data storage apparatus may be defined by one or more data erasure standards and/or may be user-definable.

The method may comprise generating the known data pattern in dependence on the predetermined proportion or amount of the total data storage capacity of the data storage apparatus.

The method may comprise selecting a plurality of regions of the memory and writing the known data pattern to each of the regions.

The plurality of regions of the memory may be distributed across the memory. The plurality of regions of the memory may be distributed substantially periodically across physical or logical locations in the memory. The plurality of regions of the memory may be spaced apart by a selected spacing in physical or logical memory space. The plurality of regions of the memory may be distributed randomly. The plurality of regions of the memory may be selected randomly within a given subset of the memory. The plurality of regions of the memory may be selected by logically "slicing" the memory into a plurality of equal sized sections with one section for each region and selecting each region of the memory randomly within a corresponding one of the sections.

The plurality of regions of memory may be defined using logical block addressing (LBA).

The known data pattern may be reproducible.

The known data pattern may comprise a predefined static pattern.

The known data pattern may be different to any data patterns known to be written by any existing types of data storage apparatus or may be different to any data specifications or data patterns defined in any existing data erasure verification standards. Writing such a different known data pattern may permit verification of the data erasure procedure performed by the data storage apparatus. The known data pattern may be generated using an algorithm or a formula.

The known data pattern may comprise at least two different data values.

The known data pattern may comprise a series of ones and zeroes or any other suitable pattern repeated at least once, for example a series of ones and zeroes repeated periodically.

The known data pattern may comprise a series of hexadecimal values or any other suitable values, repeated at least once, for example a 0xB5 series repeated periodically. The known data pattern may consist of multiple instances of a series of ones and zeroes or any other suitable values or pattern, for example wherein the known data pattern may consist of multiple instances of a 0xB5 series.

The known data pattern may comprise a random data pattern and/or an aperiodic data pattern, for example a random data pattern and/or aperiodic data pattern generated using a known seed. Different parts of the data pattern, optionally the random data pattern, may be written to the different memory locations. For example, different parts of a random data pattern generating using a seed may be written to different sectors of a drive to be deleted. Random data patterns for the different sectors or other memory locations may be generated using different seeds. In some cases a different seed may be used to generate a different random data pattern for different sectors of a drive to be deleted. If a random data pattern(s) is written to the memory, for verification purposes, more than once, for instance in response to an attempted erasure process not succeeding, or not proceeding, following the first write of the random data pattern, then the second writing of the random data pattern may be of a different random data pattern, e.g. generated using a different seed.

It may be that a different seed is used to generate the random data pattern when the method is used to erase data from different data storage apparatus. For example, each time the method is used to erase data from a different device, and different seed may be used. Thus, the data pattern that is used may be different for each device, potentially increasing security.

Alternatively, the same data pattern may be written to the different memory locations.

The known data pattern may be generated using a Random Number Generator (RNG) for example with a known fixed seed.

The method may comprise performing a preliminary verification procedure comprising determining whether a predetermined proportion or amount of data read from the memory are substantially identical. If the predetermined proportion or amount of data read from the memory are substantially identical, the method may comprise then providing a positive initial verification result, else providing a negative initial verification result. For example, the method may comprise determining whether a predetermined proportion or amount of data read from the memory are all binary zeroes or all ones, or any other consistent pattern that repeats, for example 0xCC, 0xAA, or any other clearly repeating pattern, and if the predetermined proportion or amount of data read from the memory are all binary zeroes or all binary ones or any other consistent pattern that repeats, for example 0xCC, 0xAA or any other clearly repeating pattern, then providing a positive initial verification result, else providing a negative initial verification result. The predetermined proportion of the read data may be defined by one or more data erasure standards and/or may be user-definable. The method may comprise performing the determining of said verification result in response to providing a negative initial verification result.

The method may comprise providing an indication of the type of data erasure procedure performed by the data storage apparatus based at least in part upon whether a predetermined proportion of the read data are identical.

The method may comprise providing an indication of the type of data erasure procedure performed by the data storage apparatus based at least in part upon whether a predetermined proportion of the read data and the data of the known data pattern are different.

When the known data pattern is different to any data patterns known to be written by any existing types of data storage apparatus or different to any data specifications or data patterns defined in any existing data erasure standards, providing a positive initial verification result according to whether a predetermined proportion of the read data are identical may permit the type of data erasure procedure performed by the data storage apparatus to be determined in some instances. For example, if the data erasure procedure performed by the data storage apparatus overwrites a predetermined proportion of the total data storage capacity of the data storage apparatus with all binary zeros or all binary ones, this may be detected and conveyed to a user. Alternatively, if the data erasure procedure writes random data or apparently random data to the data storage apparatus this may be detected and conveyed to the user.

The data storage apparatus may comprise a data storage apparatus of any kind. For example, the data storage apparatus may comprise at least one of: a Self-encrypting Drive (SED), a Hard Disk Drive (HDD), a Solid State Drive (SSD), Non-Volatile Memory, flash memory, NAND flash memory, a hybrid drive, Random Access Memory (RAM), a memory card of any kind, for example a MicroMediaCard (MMC) of any kind such as an embedded MMC (eMMC) card, a Secure Digital (SD) card.

The data storage apparatus may store or be associated with a data erasure routine specific to the data storage apparatus, optionally implemented in firmware, configured to perform the data erasure procedure, and the method may comprise instructing, for example by a data erasure apparatus, the performance of the data erasure routine.

The method may comprise connecting the data storage apparatus, or a device containing or associated with the data storage apparatus, to an external processing resource, and performing at least one of the writing of the known data pattern, the performing of the data erasure procedure, the reading of the data and the determining of the verification result under control of the external processing resource.

According to a further aspect, which may be provided independently, there is provided a data eraser apparatus configured to:

write a known data pattern across a plurality of known memory locations of a data storage apparatus;

perform, or cause the data storage apparatus to perform, a data erasure procedure;

read data stored at the known memory locations after completion of the data erasure procedure;

compare the read data and the data of the known data pattern; and determine a verification result based at least in part on the result of the comparison between the read data and the data of the known data pattern.

The data eraser apparatus may comprise a processor, a memory and computer-executable instructions stored in the memory, which computer-executable instructions, when executed by the processor, cause the data eraser apparatus to perform the writing, the data erasure procedure, the reading, the comparing and/or the verification The computer-executable instructions may constitute or define a host application.

The data eraser apparatus may comprise hardware and/or firmware configured to at least partially define a method comprising:

writing a known data pattern across a plurality of known memory addresses of a data storage apparatus;

causing the data storage apparatus to perform a data erasure procedure;

reading data stored at each of the known memory addresses after completion of the data erasure procedure; and determining a verification result based at least in part on the read data.

The data eraser apparatus may be, or may comprise, any kind of apparatus which is capable of writing the known data pattern across the plurality of known memory addresses of the data storage apparatus. The data eraser apparatus may be, or may comprise, any kind of apparatus which is capable of delivering an erasure payload including the known data pattern to the data storage apparatus. The data eraser apparatus may be or may comprise, for example at least one of a computer, a laptop, a tablet, a smartphone, a server.

The data eraser apparatus may be configured for the transfer of data with the data storage apparatus using an interface standard.

The interface standard may comprise at least one of Serial AT Attachment (SATA), Parallel ATA (PATA), AT Attachment (ATA) or AT Attachment Packet Interface (ATAPI), Small Computer System Interface (SCSI), Serial Attached SCSI (SAS), Universal Serial Bus (USB), Peripheral Component Interconnect Express (PCI Express or PCIe), Non-Volatile Memory Express (NVM Express or NVMe).

The data eraser apparatus may be configured for the transfer of data with the data storage apparatus using fibre channel.

The data storage apparatus may be or may comprise at least one of: a Self-encrypting Drive (SED), a Hard Disk Drive (HDD), a Solid State Drive (SSD), Non-Volatile Memory, flash memory, NAND flash memory, Random Access Memory (RAM), a memory card of any kind, for example a MicroMediaCard (MMC) of any kind such as an embedded MMC (eMMC) card, a Secure Digital (SD) card.

According to another aspect, which may be provided independently, there is provided a computer program defining computer-executable instructions which, when executed by a processor:

write a known data pattern across a plurality of known memory locations of a data storage apparatus;

perform a data erasure procedure at the data storage apparatus;

read data stored at each of the known memory locations after completion of the data erasure procedure; and compare the read data and the data of the known data pattern; and determine a verification result based at least in part on the result of the comparison between the read data and the data of the known data pattern.

In a further aspect there is provided a method and/or apparatus for intelligent verification of cryptographic erase and other firmware erasure processes.

Features in one aspect may be provided as features in any other aspect. For example, method features may be provided as apparatus features and vice versa,

BRIEF DESCRIPTION OF THE DRAWINGS

Apparatus and methods for use in data erasure will now be described by way of non-limiting example only with reference to the drawings of which.

DETAILED DESCRIPTION OF THE DRAWINGS

Figure 3A:
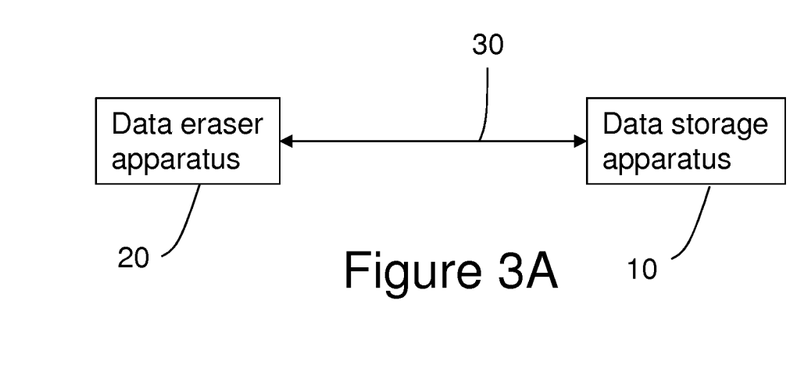
FIG. 3A schematically illustrates a data eraser apparatus in communication with a data storage apparatus.

Referring initially to FIG. 3A, there is shown a data storage apparatus 10 and a data eraser apparatus 20. In the embodiment of FIG. 3A the data storage apparatus is a self-encrypting drive. The data storage apparatus may be any other suitable type of data storage apparatus in alternative embodiments. The data storage apparatus 10 and the data eraser apparatus 20 are configured for the transfer of data there between via an interface 30. The data storage apparatus 10 is shown in more detail in FIG. 3B and the data eraser apparatus 20 is shown in more detail in FIG. 3C. Whilst the data eraser apparatus 20 is represented as a single apparatus in FIGS. 3A and 3C, it should be understood that the data eraser apparatus 20 may, alternatively, include a plurality of distributed separate devices which may collectively perform the function of the data eraser apparatus 20 as described below. Also, the data erasure eraser apparatus 20 may be located adjacent to the data storage apparatus 10 or may be located remotely from the data storage apparatus 10.

Figure 3B:
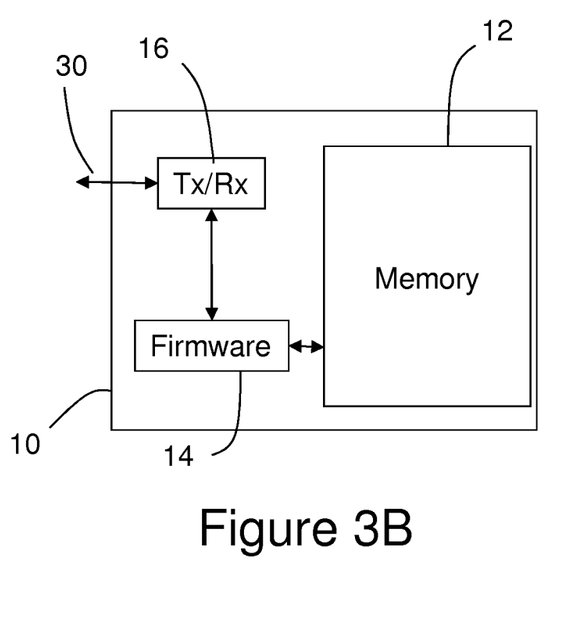
FIG. 3B schematically illustrates the data storage apparatus of FIG. 3A.

As shown in FIG. 3B, the data storage apparatus 10 includes memory 12 for data storage, firmware 14 for performing data storage and data erasure operations, and a transmitter/receiver 16 for communicating with the data eraser apparatus 20 via the interface 30. Although not shown in FIG. 3B, it should be understood that the data storage apparatus 10 may include data compression functionality for compressing data to be written to the memory 12 or for decompressing data read from the memory 12. Similarly, although not shown in FIG. 3B, it should be understood that the data storage apparatus 10 may include wear-levelling functionality for distributing data to different physical memory addresses at different times to thereby extend the lifetime of the memory 12. Although in the present embodiment the data storage apparatus 10 comprises a Self-encrypting Drive (SED), it may comprise any other suitable type of storage apparatus in alternative embodiments, for example a Hard Disk Drive (HDD), a Solid State Drive (SSD), Non-Volatile Memory, flash memory, NAND flash memory, Random Access Memory (RAM), a memory card of any kind, for example a MicroMediaCard (MMC) of any kind such as an embedded MMC (eMMC) card, a Secure Digital (SD) card.

The interface 30 may operate according to, or may be compliant with, an interface standard, for example at least one of Serial AT Attachment (SATA), Parallel ATA (PATA) or the AT Attachment (ATA) or AT Attachment Packet Interface (ATAPI) standards (for example, the interface may comprise or form part of a device using the ATI or ATAPI standard), Small Computer System Interface (SCSI), Serial Attached SCSI (SAS), Universal Serial Bus (USB), Peripheral Component Interconnect Express (PCI Express or PCIe), Non-Volatile Memory Express (NVM Express or NVMe).

Figure 3C:
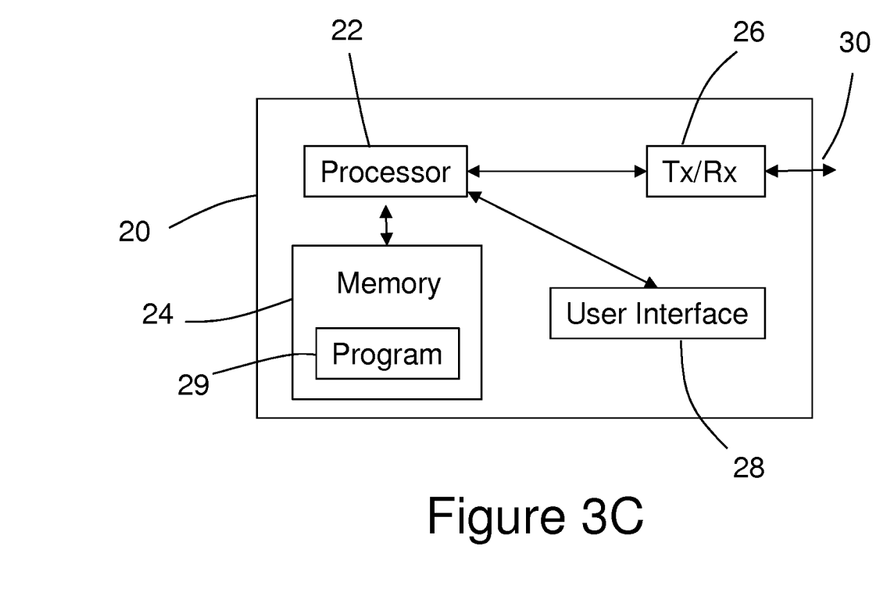
FIG. 3C schematically illustrates the data eraser apparatus of FIG. 3A.

As shown in more detail in FIG. 3C, the data eraser apparatus 20 includes a processor 22, a memory 24, a transmitter/receiver 26 and a user interface 28. Computer-executable instructions 29 are stored in the memory 24 which, when executed by the processor 22, cause the data eraser apparatus 20 to perform the data erasure method 100 illustrated in FIG. 4. The data eraser apparatus 20 may include or may be at least one of a server, a computer, and a laptop.

Figure 4:
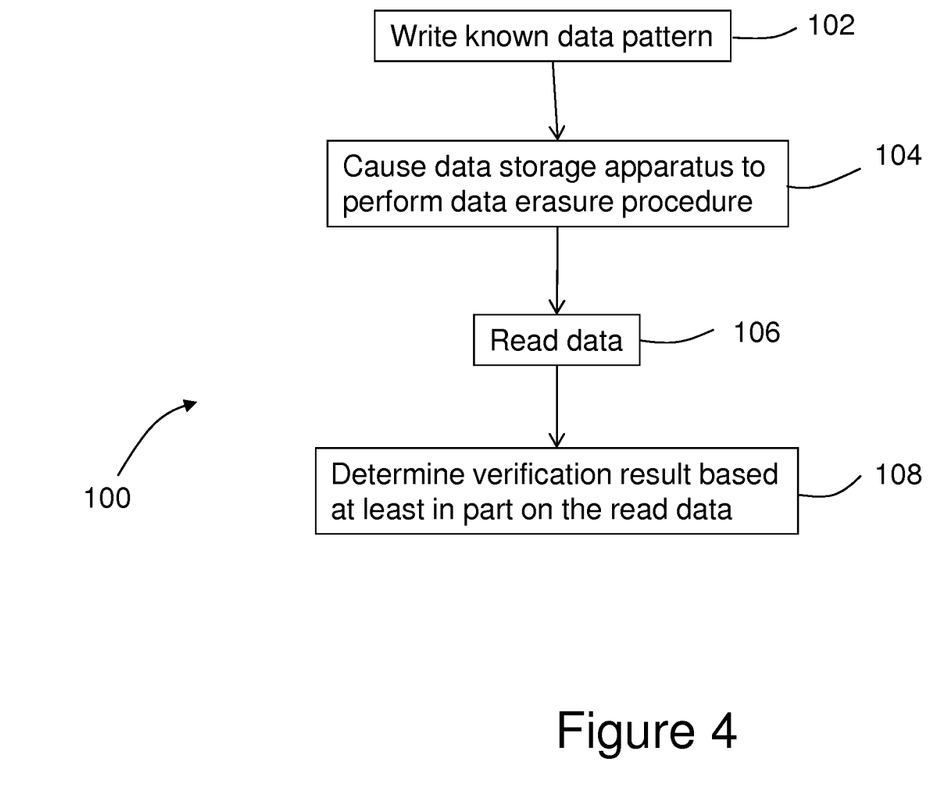
FIG. 4 schematically represents a method of data erasure.

With reference now to the data erasure method 100 illustrated in FIG. 4, at stage 102, the data eraser apparatus 20 writes a known data pattern or sequence across a plurality of known memory locations, such as known physical memory addresses, of the data storage apparatus 10.

In the embodiment of FIG. 4, the known data pattern or sequence is written directly to the memory locations without using a file system or file transfer protocol that may be provided on the memory device or associated with the memory, using known techniques, for example by using logical block addressing or any other suitable procedure. Thus, the known data pattern or sequence may be written directly to the logical addresses in the memory.

The writing of the known data directly to the memory locations, bypassing the file system, may be performed using any suitable known technique dependent on the particular type of memory. The selected memory locations to which the known data is written may comprise selected sectors, for example addressed using a numbering scheme supported by the physical memory. Any suitable number or distribution of sectors may be written to, and the process may be performed independently of the sizes of the sectors of the particular memory in question. In alternative embodiments, the data may be written as files using the file system, or may be written directly to physical locations without using logical block addressing or similar logical addressing scheme.

The known data pattern or sequence may be of any suitable size and have any suitable content, but usually a small data pattern is used and the same data pattern is written to multiple of the selected memory locations. In the embodiment of FIG. 4, a 2-byte hex value (say B5) is used. In some other embodiments a collection of hex values, or a generated block of random data is used as the repeating data pattern,.

The plurality of known memory locations may constitute a predetermined proportion or amount of the total data storage capacity of the data storage apparatus 10. The predetermined proportion or amount may be selected, for example by a user, prior to the data erasure period or may be pre-stored. For example, the plurality of known memory locations may constitute a sufficient proportion of the total data storage capacity of the data storage apparatus 10 to satisfy a given data erasure standard as will be described in more detail below. Additionally or alternatively, the plurality of known memory locations may constitute a user-defined proportion of the total data storage capacity of the data storage apparatus 10. The known data pattern or sequence takes the form of a reproducible data pattern or sequence such as a data pattern or sequence generated using a Random Number Generator (RNG) with a known fixed seed. Any suitable size of data pattern or sequence may be determined using the RNG and seed, for example by selecting a position or range of positions in a number sequence and generating the random numbers corresponding to the position or range of positions. Thus, it may not be necessary to temporarily store or cache a large number sequence in order to perform the verification procedure. Any suitable known RNG or procedure for generating random or pseudo-random numbers may be used.

Different parts of the random data pattern may be written to the different memory locations in some embodiments. For example, different parts of a random data pattern generating using a seed may be written to different sectors of a drive to be deleted, or random data patterns for the different sectors or other memory locations may be generated using different seeds. In some cases a different seed may be used to generate a different random data pattern for different sectors of a drive to be deleted.

If a random data pattern(s) is written to the memory, for verification purposes, more than once, for instance in response to an attempted erasure process not succeeding or not proceeding, following the first write of the random data pattern, then the second writing of the random data pattern may be of a different random data pattern, e.g. generated using a different seed In some embodiments a different seed is used to generate the random data pattern when the method is used to erase data from different data storage apparatus. For example, each time the method is used to erase data from a different device, a different seed may be used. In some embodiments, several data storage devices may be erased in parallel using the same data eraser apparatus. In such embodiments, for example, the same random data pattern/seed may be used for each of the data storage devices.

At stage 104, the data eraser apparatus 20 sends a command to the data storage apparatus 10 via the interface 30 to cause the data storage apparatus 10 to perform a data erasure procedure defined by the firmware 14 of the data storage apparatus 10.

In the embodiment of FIG. 3, the data storage apparatus 10 comprises an encrypting storage apparatus, in this case a self-encrypting drive, and the data erasure procedure at stage 104 comprises deleting, replacing or overwriting a key, for example a media encryption key, stored by the encrypting drive and used by the encrypting drive as part of an encryption and/or decryption process to encrypt and/or decrypt data stored by the data storage apparatus. If the deletion, replacement or overwriting of the key is successful then data that is subsequently read from the drive may be decrypted but the decrypted data will not reflect the original, stored, meaningful data (e.g. data that may be used to build files, applications or any other kind of data) and may, for example, appear to be random, pseudo-random, meaningless or useless data.

At stage 106, after completion of the data erasure procedure, the data eraser apparatus 20 reads the data stored at the known memory addresses as part of a verification procedure to determine whether the erasure procedure (in this case the deletion, replacement or overwriting of the key for example) has been performed correctly.

Subsequently, a verification result is determined at stage 108 based at least in part on the read data. For example, the verification result may be determined at stage 108 based at least in part on the result of a comparison between the read data and the data of the known data pattern as will now be described with reference to FIG. 5. Specifically, the known data pattern is reproduced or regenerated (for example using the same seed that was used to generate the known data pattern originally) and the read data and the data of the known data pattern are compared at stage 200 in FIG. 5.

Figure 5:
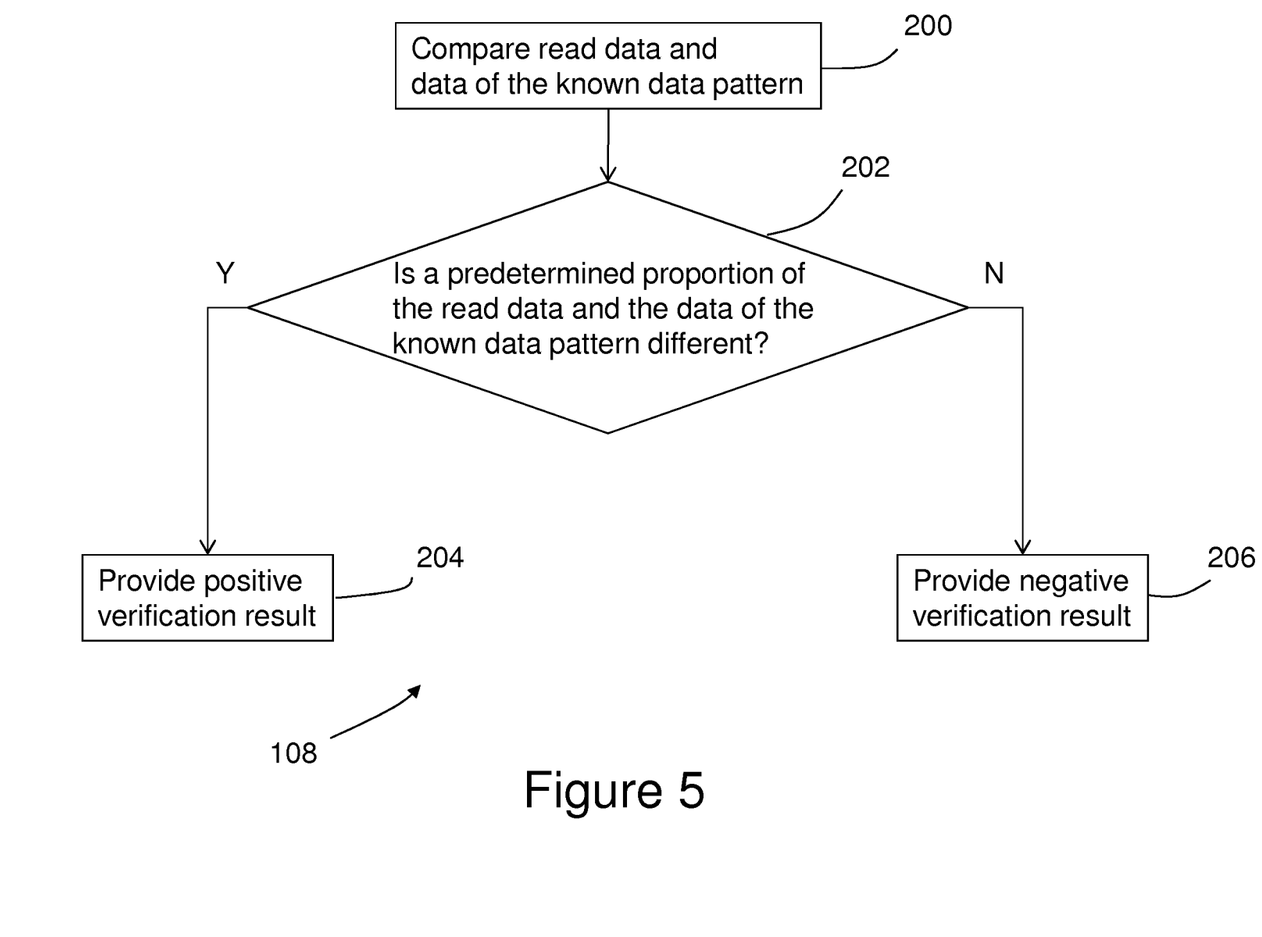
FIG. 5 schematically represents a method of determining a data erasure verification result for use with the method of data erasure of FIG. 4.

At stage 202, it is determined whether a predetermined proportion of the read data and the data of the known data pattern is different. For example, it may be determined whether all of the read data and the data of the known data pattern is different. If it is determined that the predetermined proportion of the read data and the data of the known data pattern is different at stage 202, a positive verification result is provided at stage 204, indicating that the erasure procedure has been successful. Conversely, if it is determined that the predetermined proportion of the read data and the data of the known data pattern is the same, a negative verification result is provided at stage 206.

The data erasure method 100 described with reference to FIGS. 4 and 5 may be advantageous over known data erasure methods for several reasons. Firstly, in the data erasure method 100 described with reference to FIGS. 4 and 5, there may be no requirement to read data from the data storage apparatus 10 prior to the data storage apparatus 10 performing the data erasure procedure. Thus, there may be no need to store any data read from the data storage apparatus 10 prior to the data storage apparatus 10 performing the data erasure procedure. This may be particularly advantageous where a data erasure standard requires verification of data erasure for a significant proportion of the total data storage capacity of a data storage apparatus 10.

Secondly, the data erasure method 100 described with reference to FIGS. 4 and 5 may require no detailed knowledge of the data erasure procedure performed by the data storage apparatus 10, which data erasure procedure is defined in the firmware 14 of the data storage apparatus 10. In other words, the data erasure method 100 described with reference to FIGS. 4 and 5 may be reliable, verifiable and agnostic with respect to the data erasure procedure performed by the data storage apparatus 10.

Thirdly, the data erasure method 100 may provide a verification result which is scalable according to any given erasure standard and/or according to a particular user's preferences in the sense that data erasure verification may be performed by comparing the read data and the data the known data pattern across a predetermined proportion of the total data storage capacity of the data storage apparatus 10.

The erasure procedure is not necessarily self-contained. It may for example be used any time a firmware erasure command is used on a device, and/or it may be integrated as part of another standard. For example, the erasure procedure may involve various stages and one of those may be a firmware erasure procedure. According to embodiments, a fall back erasure process may be enabled depending on the outcome of a verification procedure according to embodiments. For example, according to National Institute of Standards and Technology (NIST) standards both crypto and block erase are viable means of erasing an SSD. In some embodiments if the verification procedure indicates that there has been a failure of an erasure procedure, for example for the whole device or for one or more blocks or other portions of the logical (or physical) device, a different erasure procedure may then be used, either automatically or on user command, in response to the negative verification result. For example, there may be a fall back to use of a cryptographic erasure procedure following a failed block erase procedure (or vice versa) and an indication of this may be provided to the user.

Figure 6:
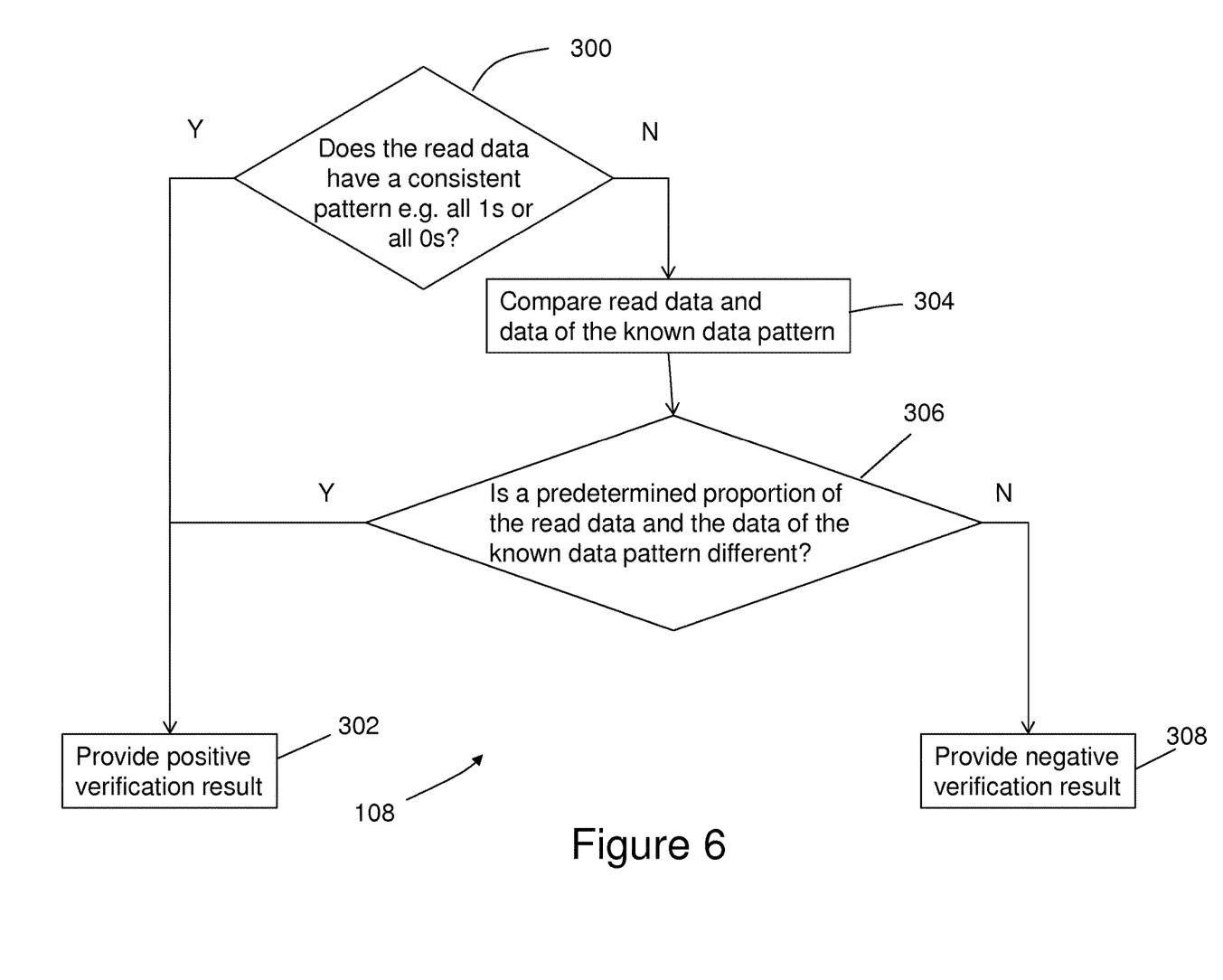
FIG. 6 schematically represents an alternative method of determining a data erasure verification result for use with the method of data erasure of FIG. 4.

FIG. 6 illustrates an alternative method of determining the verification result, for example at stage 108 of FIG. 4. This alternative method begins at stage 300 with a preliminary verification procedure comprising an initial check to determine whether a predetermined proportion of the read data is identical. For example, stage 300 may include determining whether all of the read data is all binary zeros or all binary ones. If it is determined that a predetermined proportion of the read data is identical at stage 300, this is deemed to be indicative that the data erasure procedure performed by the data storage apparatus 10 at stage 104 has successfully replaced the sensitive data that was originally stored on the data storage apparatus 10 at the known memory addresses with redundant or null data such as all binary zeros or all binary ones, and a positive verification result is provided at stage 302. If, on the other hand, it is determined that a predetermined proportion of the read data is different at stage 300, the known data pattern is reproduced or regenerated and the read data and the data of the known data pattern are compared at stage 304. At stage 306, it is determined whether a predetermined proportion of the read data and the data of the known data pattern is different. For example, it may be determined whether all of the read data and the data of the known data pattern is different. If it is determined that the predetermined proportion of the read data and the data of the known data pattern is different at stage 306, a positive verification result is provided at stage 302. Conversely, if it is determined that the predetermined proportion of the read data and the data of the known data pattern is the same, a negative verification result is provided at stage 308.

Thus, the alternative method of determining the verification result described with reference to FIG. 6 allows for the possibility that the data storage apparatus 10 may perform an erasure operation in which the stored sensitive data is replaced with repeating redundant or null data whilst also allowing for the possibility that the data storage apparatus 10 may perform an erasure operation in which the stored sensitive data is replaced with apparently random data, for example as a result of the data storage apparatus 10 performing a cryptographic erasure procedure.

According to at least some embodiments, to counter the effects of unpredictable firmware erasure or to handle cryptographic erasure processes, means of assuring the actions may be used by the software undertaking the process. The approach to resolve this issue is to write control data to the device before firmware erasure so that the removal or absence of data can be checked. This makes it possible to assure that data has been erased as the previous state can be known in advance (the host software already knows what data it wrote). By ensuring that the known data has been removed, it can be concluded that the erasure was successful, even in situations when the result of an erasure process is random data being present. This process can scale with the user's requirements e.g. it can cover X % of the drives addressable area, meaning that the assurance related to the process can also scale.

There should be an increase in throughput for drives that do not comply with standards or produce unexpected results but still remove data. This also enables the software to highlight non-compliance with a standard. This could be useful when informing users of the software as their internal policy may require them to only use specific processes. The result of the process may be a suggestion to the user that the outcome was not the one that was expected. This may allow the user to provide further intelligence to the verification process.

A process according to certain embodiments may comprise the following:

1. Write a known data set (the data may be, for example, a defined pattern or a pattern generated using an RNG, with a fixed seed) to specific areas throughout the drive:
   a. Data is spread across the device to ensure widespread coverage
   b. Amount of data written is based on the % selected by the user or determined by an erasure standard or other requirement
2. Engage the firmware erasure (overwrite, crypto, block)
3. Start verification process
   a. First check for a consistent pattern filling the drive surface (e.g. all 1s or all 0s) which may indicate that data has been successfully erased and/or that user data is not present.
   b. If this fails, check instead for the absence of the previously written data.

In some embodiments, one or more of the above stages may be omitted. For example, stage 3a may be omitted in some embodiments.

One of ordinary skill in the art will appreciate that various modifications may be made to the apparatus and methods described above. For example, the data storage apparatus may comprise hardware and/or software which at least partially define the data erasure procedure performed internally within the data storage apparatus. Rather than writing a known data pattern generated using a RNG with a known fixed seed, other data patterns may be used. For example, the known data pattern may be generated using an algorithm or a formula of any kind. The known data pattern may include at least two different data values. The known data pattern may be repetitive and/or periodic. The known data pattern may be different to any data patterns known to be written by any existing types of data storage apparatus or may be different to any data specifications or data patterns defined in any existing data erasure verification standards. Writing such a different known data pattern may permit verification of the data erasure procedure performed by the data storage apparatus. Writing such a different known data pattern may also permit the type of data erasure procedure performed by the data storage apparatus to be determined in some instances. For example, if the data erasure procedure performed by the data storage apparatus overwrites a predetermined proportion of the total data storage capacity of the data storage apparatus with all binary zeros or all binary ones, stage 300 of the method shown in FIG. 6 would detect this and this information could be conveyed to a user of the data eraser apparatus 20 via the user interface 28. Alternatively, if the data erasure procedure writes random data or apparently random data to the data storage apparatus 10, stage 306 of the method shown in FIG. 6 would detect this and this information could be otherwise conveyed to a user of the data eraser apparatus 20 via the user interface 28.

Although the data erasure methods of FIGS. 4, 5 and 6 may be defined by computer-executable instructions 29 stored in the memory 24, it should be understood that at least part of the data erasure methods of FIGS. 4, 5 and 6 may be defined in hardware and/or firmware or in any other suitable fashion.

Embodiments described herein are described purely by way of example and modifications whilst still remaining within the scope of the invention as defined by the appended claims.

The invention claimed is:

1. A method of erasing data from a data storage apparatus comprising a memory, the method comprising:
   writing a known data pattern to a plurality of known memory locations of the data storage apparatus;
   causing the data storage apparatus to perform a data erasure procedure;
   reading data stored at the known memory locations after completion of the data erasure procedure;
   comparing the read data and the data of the known data pattern; and
   determining a verification result based at least in part on the result of the comparison between the read data and the data of the known data pattern.

2. The method according to claim 1, wherein at least one of:
   a) the plurality of known memory locations of the data storage apparatus are physical locations;
   b) the known memory locations of the data storage apparatus are defined using logical block addressing (LBA); or
   c) the writing and/or reading is performed without using a file system and/or file transfer protocol associated with the memory.

3. The method according to claim 1, wherein the data erasure procedure comprises erasing data from substantially all of the addressable memory.

4. The method according claim 1, wherein the data erasure procedure comprises writing a further data pattern to the memory.

5. The method according to claim 4, wherein the further data pattern comprises at least one of: a predefined static pattern, all 1s, all 0s, a random data pattern, a series of ones and zeroes repeated at least once, wherein the zeroes repeated at least once comprises a 0x55, 0xAA or 0x3C series repeated at least once, or a series of ones and zeroes repeated periodically, wherein the series of ones and zeroes repeated periodically comprises a 0x55, 0xAA or 0x3C series repeated periodically.

6. The method according to claim 1, wherein the data erasure procedure comprises replacing or deleting a key used to encrypt and/or decrypt data.

7. The method according to claim 1, further comprising providing a positive verification result according to whether a predetermined proportion or amount of the read data and the data of the known data pattern are different or comprising providing a positive verification result according to whether all of the read data and the data of the known data pattern are different.

8. The method according claim 1, further comprising providing a negative verification result according to whether a predetermined proportion or amount of the read data and the data of the known data pattern are substantially the same.

9. The method according claim 1, further comprising:
in response to the providing of a negative verification result performing at least one of:
causing the data storage apparatus to perform the data erasure procedure one or more additional times;
indicating that the data storage apparatus should be destroyed; or
performing an alternative erasure procedure.

10. The method according to claim 1, further comprising writing the known data pattern across a predetermined proportion or amount of a total data storage capacity of the data storage apparatus, for example at least 1%, 2%, 5% or 10% of the total data storage capacity of the data storage apparatus.

11. The method according to claim 10, further comprising generating the known data pattern in dependence on the predetermined proportion or amount of the total data storage capacity of the data storage apparatus.

12. The method according to claim 1, further comprising selecting a plurality of regions of the memory and writing the known data pattern to each of the regions.

13. The method according to claim 12, wherein at least one of:
the plurality of regions of the memory are distributed across the memory;
the plurality of regions of memory are distributed substantially periodically across physical locations in the memory;
the plurality of regions of memory are spaced apart by a selected spacing in physical memory space;
the plurality of regions of the memory may be distributed randomly;
the plurality of regions of the memory may be selected randomly within a given subset of the memory;
the plurality of regions of the memory may be selected by logically slicing the memory into a plurality of equal sized sections with one section for each region and selecting each region of the memory randomly within a corresponding one of the sections; or
the plurality of regions of memory are defined using logical block addressing (LBA).

14. The method according to claim 1, wherein at least one of:
the known data pattern is reproducible;
the known data pattern comprises a predefined static pattern;
the known data pattern is generated using an algorithm or a formula;
the known data pattern comprises at least two different data values;
the known data pattern comprises a series of ones and zeroes repeated at least once, for example a series of ones and zeroes repeated periodically;
the known data pattern comprises a 0xB5 series repeated at least once, for example a 0xB5 series repeated periodically;
the known data pattern consists of multiple instances of a series of ones and zeroes, for example wherein the known data pattern consists of multiple instances of a 0xB5 series; or
the known data pattern is generated using a Random Number Generator (RNG) with a known fixed seed.

15. The method according to claim 1, further comprising performing a preliminary verification procedure comprising:
determining whether a predetermined proportion or amount of data read from the memory are substantially identical.

16. The method according to claim 15, further comprising providing a positive initial verification result if the predetermined proportion or amount of data read from the memory are substantially identical or have consistent values, otherwise providing a negative initial verification result.

17. The method according to claim 15, further comprising:
determining whether the predetermined proportion or amount of the data read from the memory are all binary zeroes or all binary ones or any other consistent pattern that repeats, for example 0xCC 0xAA or any other clearly repeating pattern; and
if the predetermined proportion or amount of data read from the memory are binary zeroes or binary ones or any other consistent pattern that repeats, for example all 0xCC, 0xAA or any other clearly repeating pattern then providing a positive initial verification result, else providing a negative initial verification result.

18. The method according to claim 15, further comprising performing the determining of said verification result in response to providing a negative initial verification result.

19. The method according to claim 1, wherein the data storage apparatus is, or comprises, at least one of an encrypting data storage apparatus, a Self-encrypting Drive (SED), a Hard Disk Drive (HDD), a Solid State Drive (SSD), Non-Volatile Memory, flash memory, NAND flash memory, Random Access Memory (RAM), or a memory card, wherein the memory card includes a MicroMediaCard (MMC), wherein the MMC includes at least one of an embedded MMC (eMMC) card or, a Secure Digital (SD) card.

20. The method according to claim 1, wherein the data storage apparatus stores or is associated with a data erasure routine specific to the data storage apparatus, optionally implemented in firmware, configured to perform the data erasure procedure, and the method comprises instructing by a data erasure apparatus the performance of the data erasure routine.

21. The method according to claim 1, wherein the data storage apparatus comprises at least one of hardware, firmware, or software and the data erasure procedure is defined by at least one of the hardware, firmware, or software of the data storage apparatus.

22. The method according to claim 1, further comprising connecting the data storage apparatus, or a device containing the data storage apparatus, to an external processing resource, and performing at least one of the writing of the known data pattern, the performing of the data erasure procedure, the reading of the data or the determining of the verification result under control of the external processing resource.

23. A non-transitory computer readable medium comprising computer-executable instructions that are executable to: write a known data pattern across a plurality of known memory locations of a data storage apparatus; perform a data erasure procedure at the data storage apparatus; read data stored at each of the known memory locations after completion of the data erasure procedure; compare the read data and the data of the known data pattern; and determine a verification result based at least in part on the result of the comparison between the read data and the data of the known data.

* * * * *